(No Model.)
A. R. & R. ROBB.
SEWER TRAP.
No. 249,260. Patented Nov. 8, 1881.
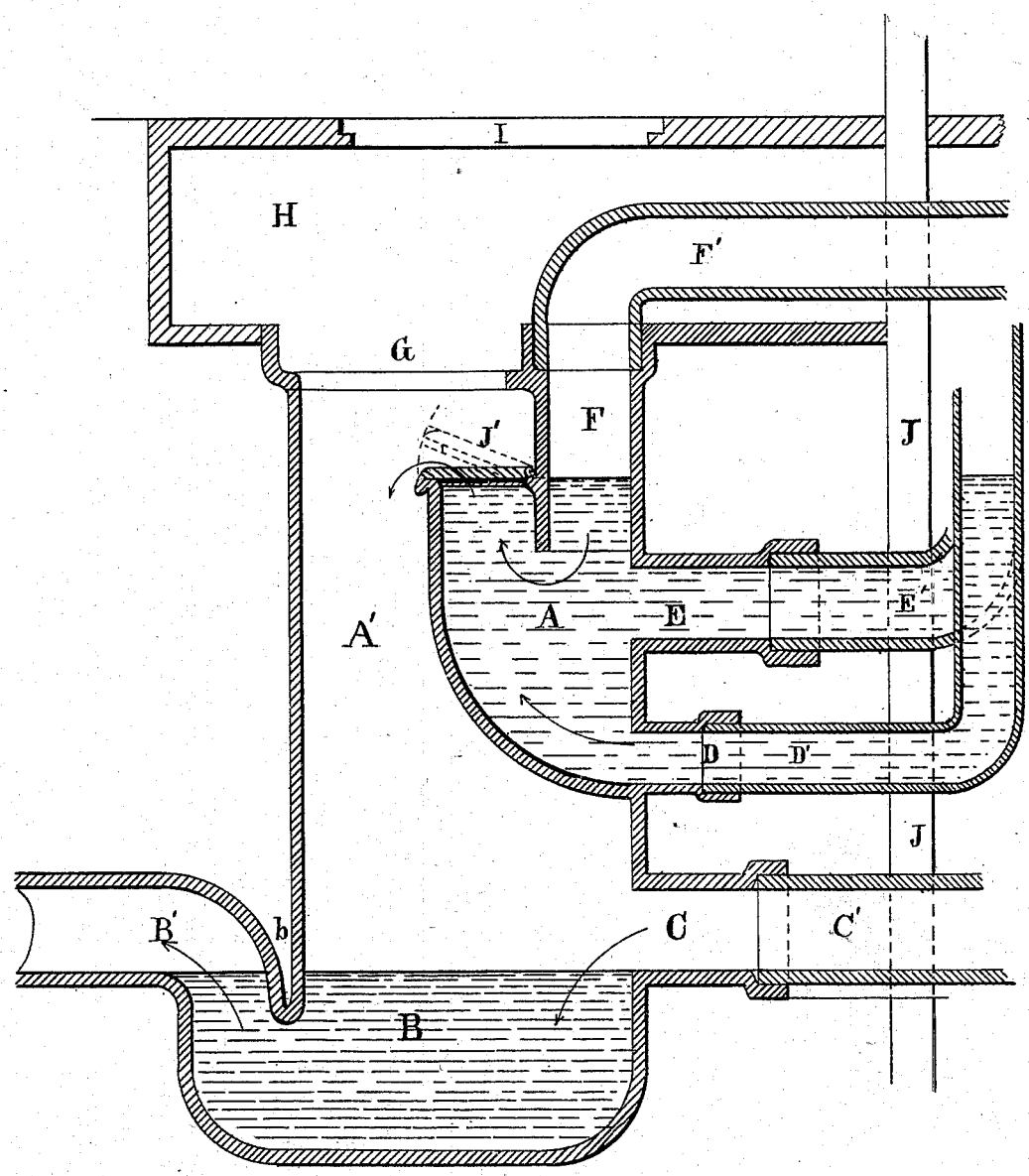
Attest
D. G. Dixon
Chas. B. R. Colledge.
Inventors
Alexander R. Robb
Ralph Robb
Per Wm. R. Singleton
Atty

UNITED STATES PATENT OFFICE.

ALEXANDER R. ROBB AND RALPH ROBB, OF BROOKLYN, NEW YORK, ASSIGNORS TO THEMSELVES, JAMES R. ROBB, JANE E. ROBB, AND JAMES McALLEY, ALL OF SAME PLACE.

SEWER-TRAP.

SPECIFICATION forming part of Letters Patent No. 249,260, dated November 8, 1881.

Application filed July 30, 1881. (No model.)

*To all whom it may concern:*

Be it known that we, ALEXANDER R. ROBB and RALPH ROBB, of Brooklyn, in the county of Kings and State of New York, have invented certain Improvements in Sewer-Traps, of which the following is a specification.

This invention relates to certain improvements in sewer-traps; and it consists in the manner in which the several inlet-pipes are arranged and the employment of a cistern or basin between the inlet-pipes from the various sinks or traps and the main or lowest trap, all of which will be more fully hereinafter described, and set forth in the claim.

In the drawing, which is a vertical section through the middle of the trap, A represents a cistern or basin placed inside of an ordinary trap, A', and which works like a cataract overflowing into the lower portion, B, of the trap A', having its outlet-pipe B'.

C is the pipe-inlet for rain-water leader C' from the side of the house, which side is represented by the vertical lines J. This rain-water pipe C' is to be made tight at its joints, and as it opens at the top of the wall near the eaves-trough, it becomes a sure ventilator for the trap, while it acts as a complete flushing-pipe during rain-storms to carry off everything in the trap. It also serves to prevent any tendency in the cistern or basin A to siphonage.

D is an inlet-pipe from the bath-room, wash-basins, wash-tubs, kitchen-sinks, &c., giving a greater depth of water-seal than can be had when the pipes pass through the water-closet pipes.

E and F are different water-closet inlets. One only may be used, according to the manner in which it may be requisite to enter them into the cistern to suit the plumbing in the house, as some traps may be constructed one way or the other.

G is the man-hole for cleaning the trap.

H is a vault, to be built when the trap is laid under ground outside of a building, having a man-hole, I, to give easy access to the trap.

J' is a clack-valve, designed to prevent water backing into the house.

By this arrangement of a receiving cistern or basin, A, inside the trap-pipe A', and the rain-water pipe C' opening into the trap above the cesspool B, all the foul gases are carried off through the rain-water pipe to the top of the house. The intervention of the cistern prevents the sewer-gas from entering through any of the pipes back into the house.

When the trap is to be placed inside of a house, as is often necessary, one inlet-pipe only will be used to connect with cistern A for water-closets, baths, wash-basins, &c.

I claim—

A sewer-trap consisting of an upper water-sealing basin and check-valve, in combination with a lower water-seal having the rain-water pipe above the water, substantially as and for the purpose described.

ALEXANDER RIDDELL ROBB.
RALPH ROBB.

Witnesses:
PETER TROY,
THOMAS BOLGER.